C. P. Leavitt. Impt in Air Engines.    Sheet.1.

No. 107928

Patented Oct 4 1870

Witnesses:
Fred Haynes
R. J. Rablew

Chas. P. Leavitt

C.P. Leavitt. Imp.t in Air Engines.
Sheet 2.
Fig: 3
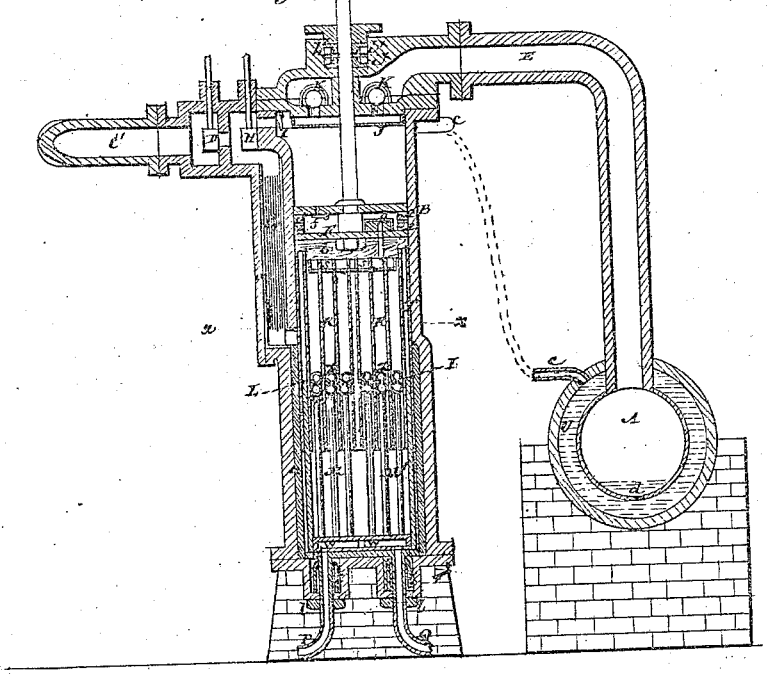
Fig: 4
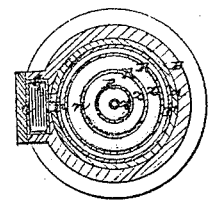
Fig: 5
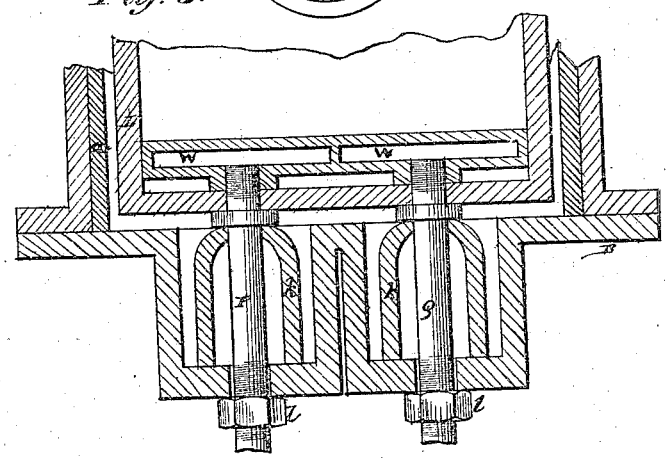
Witnesses:
Fred Haynes
R.F. Mabeew
Chas. P. Leavitt

UNITED STATES PATENT OFFICE.

CHARLES P. LEAVITT, OF NEW YORK, N. Y.

Letters Patent No. 107,928, dated October 4, 1870.

IMPROVEMENT IN HOT-AIR ENGINES.

The Schedule referred to in these Letters Patent and making part of the same.

*To all whom it may concern:*

Be it known that I, CHARLES P. LEAVITT, of the city, county, and State of New York, have invented a new and useful Improvement in Hot-air Engines, of which the following is a full, clear, and exact description, reference being had to the accompanying drawing forming part of this specification, and in which—

Figure 1:
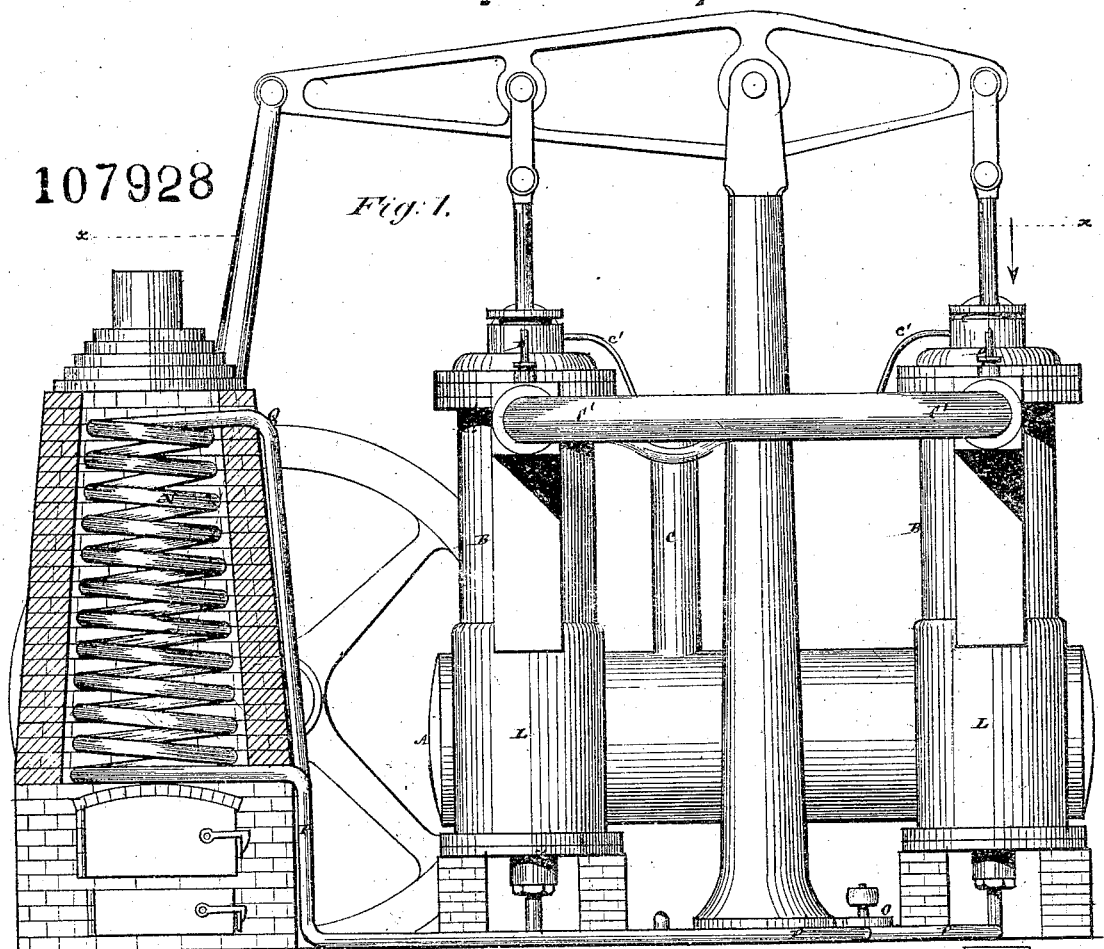
Figure 2:
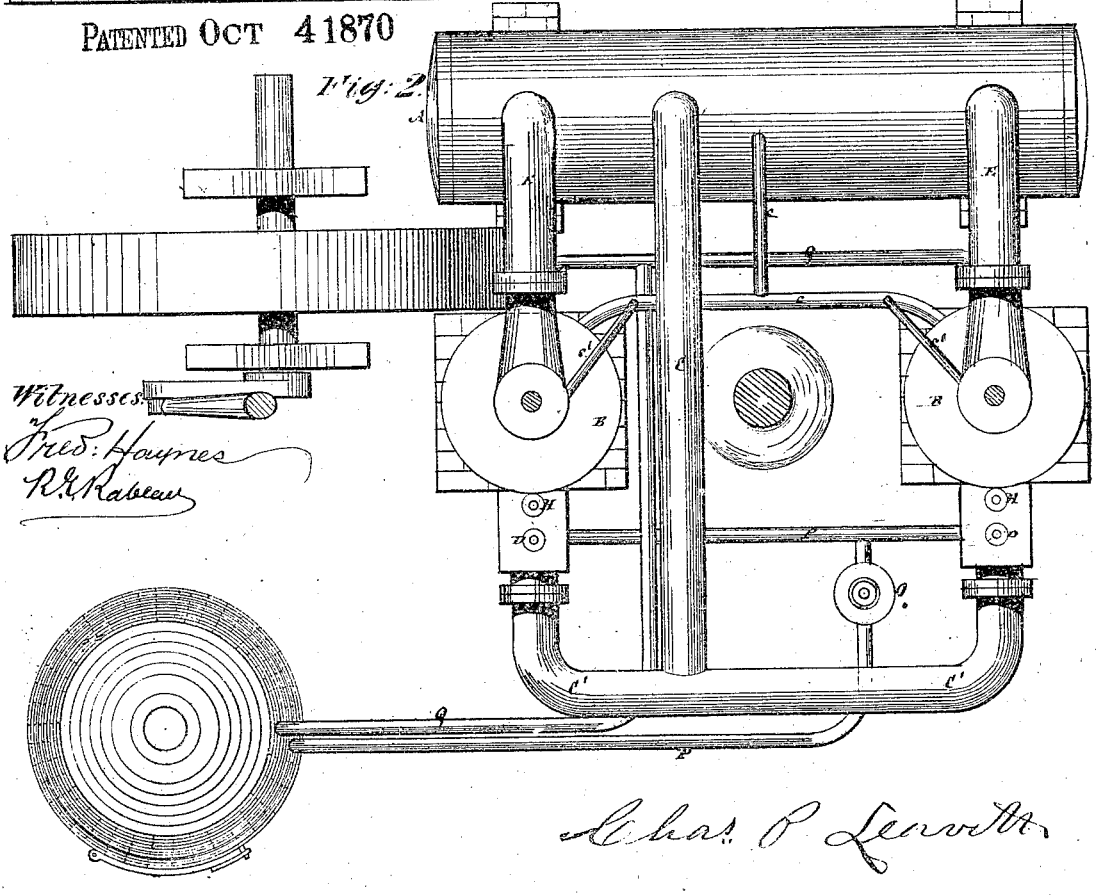

Figure 1 represents a hot-air engine embracing my improvement, with a portion of the inclosing-wall or outer case of the heat-generator removed;

Figure 2, a sectional plan of the same, taken as indicated by the line $x\ x$ in fig. 1;

Figure 3, a sectional elevation of one of the working-cylinders, with parts immediately pertaining thereto, and air-receiver and cooler attached;

Figure 4 is a horizontal section through said working cylinder, taken, mainly, as indicated by the line $x\ x$ in fig. 3; and Figure 5, a sectional elevation, on an enlarged scale, of the lower portion of the heater or tank thereof at the bottom of the working-cylinder, with its inlet and outlet attachments, for the circulating liquid, in illustration of the joint establishing such connections.

Similar letters of reference indicate corresponding parts.

My invention relates to that class of engines in which the power is derived from alternately heating and cooling atmospheric air, or other suitable gaseous fluid, said air or fluid being worked under compression, and the heat primarily communicated to it by oil or other liquid, gas, or vapor, heated by a suitable furnace; and The invention, which I denominate a thermostatic engine, embraces various novelties in the method of working and in the construction of the engine, which contribute materially to its success, the same including an advantageous mode of imparting heat to the air in the working-cylinder of the engine by the coursing of a hot liquid through a tubular structure in the lower end of said cylinder, serving to heat a liquid surrounding the tubes of said structure, into which prolongations of the piston are made to dip.

Also, the invention includes a sprinkler or cooler to the exhaust air in the upper portion of the working cylinder after the same has imparted a certain amount of its heat to a metallic reservoir or transfer-chamber that serves to heat the incoming air.

Besides these, the invention includes various details, as hereinafter described, for making more perfect such system or method of working a high-pressure hot-air engine, in which it is not intended to claim, broadly, transferring the heat from the furnace by a hot liquid, nor yet to restrict the heating-liquid to any particular description, and the same may either be mercury, a fusible metal, steam, or oil, which latter it will suffice here to refer to as the heating-medium.

Prior to describing the engine represented in the accompanying drawing, which is but one form of applying the invention, it may here be remarked that, while but two working cylinders are here shown, with their pistons arranged to move simultaneously in reverse directions, and each, as usual in such engines, only exerting power on the crank during its one or up-stroke, it is preferred to use four cylinders, with their pistons and cranks arranged to avoid the occurrence of a dead-center, and operating to produce a more regular motion. When four cylinders are used, then the air-receiver, hereinafter referred to, may be dispensed with, and said cylinders made alternately and successively to take the place of said receiver.

A in the drawing represents an air-receiver and cooler, in which the air is compressed till it reaches the requisite pressure;

B B are the working cylinders; and

C C C', the pipes which convey the air from the receiver to said cylinders through valves D, when the same are opened for the purpose, and which is, during the up-stroke of the piston, or during a portion thereof, according to the period of cutting off to work the air expansively in the cylinders.

E E are the return-pipes, for the exhaust air and cooling-liquid, to the receiver A.

The air, after it has performed its duty in an expanded and highly-heated state in either cylinder, below the piston F thereof, is passed out from said cylinder, by and during the descent of the piston, up through a metallic reservoir or transfer-chamber, G, formed of suitably-separated laminæ or plates, to which it transmits a large portion of its heat, for the purpose of heating the incoming air, to supply the next stroke of the engine, and for preparatorily cooling the exhaust air before it is passed into the working cylinder above the piston, where it is further cooled, as will be hereinafter described.

Said exhaust air is thus returned to the working cylinder through valves H I, open during the descent of the piston, but closed in its ascent. The object of the flap-valve I is to diminish the friction of the slide-valve H, and protect it from pressure of the air in the upper portion of the cylinder. The arrangement of the regenerator or transfer-chamber G between the upper and lower ports of the working cylinder, so as to form a vertical passage which communicates with the cylinder at both ends, is essential to the use or working of the air, as described, and the peculiar form or vertical elongation of the lower port is also necessary to the successful operation of the engine.

Said transfer-chamber is protected from loss of heat by a lining, $a$, of suitable non-conducting material, and the construction, preferably, is such as to allow of the plates composing it being readily accessible for adjustment.

The partially-cooled exhaust air, after its leaving the transfer-chamber G, and return to the working cylinder above the piston, is there further cooled by a sprinkler, J, and, subsequently, that is, in the next ascent of the piston, expelled, by the latter, back through valves K K and the return-pipe E, to the receiver A. The sprinkler J, in the upper part of each working cylinder, is supplied with cooling water, oil, or other liquid, by or from a receiver under a steady high pressure, such as the receiver A, operating to impel the fluid through the shower-pan or sprinkler, whenever the pressure in the working cylinder is below that of said receiver.

To this end, the cooling-liquid is fed to the sprinkler J by a pipe, c, from a jacket, U, arranged to surround the air-chamber A, but in open communication with the latter by a lower opening, d, so that the air and water or cooling-liquid returned by the piston in its up-stroke through the pipe E, will readily find their respective places, and the cooling-liquid in the jacket U serve to keep the air-receiver tight. The confined air and gas in the receiver and cooler A, acting upon the surface of the cooling-liquid rising through the opening d, expels said liquid into the shower-pan J, whenever the pressure in the working cylinder is sufficiently below that of the air in the receiver. After said cooling-liquid has performed its duty within the cylinder, it is returned, along with the cooled exhaust air, by the piston, in its up-stroke, back through the valves K K and pipe E, to the receiver A and its jacket U. These valves K K, which answer the twofold purpose of returning the air and the cooling-liquid, are so arranged as that, when closed, they will be protected and sealed by a retained layer or thin body of the cooling-liquid.

The transfer-chamber G, as hereinbefore referred to, is made to impart heat, derived from the exhaust air passing up through it, to the incoming air, which has to pass down through between the heating-plates of said chamber before it enters the cylinder below the piston. Here said incoming air is still further heated and highly expanded, to give to it an effective propelling power on the piston, by hot oil or liquid in the tank L, which derives its heat from a larger mass of hot liquid, circulated in a coil of pipe, N, of a suitable furnace or generator, and driven rapidly by any proper forcing device, O, up through one set of tubes, M, and down through another set of tubes, M', contained within a tank, L, situated in the lower extension of the working cylinder, the circulation being kept up through pipes P and Q, and the heat from the hot liquid, thus coursing the tubular structure in the bottom of the working cylinder, being communicated to the liquid contained within the tank L, for the purpose of heating the air in the working cylinder. By this combination of exterior and interior liquids the primary heating-fluid is protected from the high pressure of the interior of the working cylinder, inasmuch as it is confined by pipes or tubes, through which it is rapidly driven; also, the secondary heated liquid surrounding the tubes M M' is otherwise made available beyond imparting heat in a direct manner to the air in the working cylinder, viz: connected with each piston F, are downwardly-projecting cylindrical metallic prolongations, such as the laminæ R R, which, as they dip into and leave the heated liquid in the tank L, surrounding the tubes, impart heat to the air in the working cylinder, and regulate and confine the hot liquid which falls between them. These prolongations or heaters should have suitable perforations to allow the free passage of the hot air.

The piston F, which should be suitably protected at its bottom by a non-conducting facing, b, is provided with sprinklers or sprinkling-cups, S S S, of any suitable form, between the laminæ, to dip up and shower the hot liquid, for the purpose of imparting additional heat to the expanding air.

Said piston F is likewise made to retain the heat communicated to the air, and, at the same time, to protect the working cylinder from hot air below the piston, by means of a shield or prolongation, T, of a cylindrical form, and made to fit the interior of the working cylinder. By thus constructing and providing the piston F, the air and heating-liquid are kept in their proper places, and the cylinders kept cool while the air is heated by the oiled surface of the laminæ during its expansion within the cylinder.

The aforesaid shield is vertically slotted, for the passage of the air coming in through the lower port from the transfer-chamber, and the laminæ also have such openings as may be necessary for the movement of the air. These slots are seen at $n$ $n$, fig. 4. The vertical elongation of the aforesaid lower port is for the purpose of making the opening slot of the shield as narrow as practicable.

The portion of the cylinder containing the tank L is lined by a non-conducting material, a, to prevent loss by outward radiation, and the tank L may have similar lining.

The heater contained within the tank L, by means of which the liquid in the tank is kept hot, consists of the liquid-chambers W W, (in one of which the liquid is received, and from the other discharged by pipes P Q,) of the vertical tubes or passages M M', and the horizontal tubes or passages Z Z.

These parts are so arranged as to allow the passage of the vertical prolongations of the piston between them, and the entire heater can be moved from the tank when necessary, by unscrewing its connections with the pipes P and Q. These pipes hold it down firmly when they are drawn downward by the nuts $l$ $l$.

The joints where the pipes P and Q enter and leave the lower end of the cylinder and the tank L, are made in such a way as to counteract the effects of the excessive heat in the passing fluid, viz: the portion of the cylinder at which the pipes pass through is depressed several inches below the level of the tank, making a protective chamber through which the pipes reach the tank, surrounded as they pass by the short cylindrical pipes $k$ $k$, which are in contact with the tank above and the cylinder below, by their ends, on which the joints are made, and are made tight by screwing down the pipes P and Q by the nuts $l$ $l$.

The pipes P and Q, being connected by screwing with the bottom of the tank L, will thus draw it down forcibly, and firmly compress the ends of $k$ $k$ against the tank above, and the cylinder below, thus making joints which are not in contact with the heated pipe.

The entire spaces between $k$ $k$ and P Q, and between $k$ $k$ and the walls of the cylinder, are filled with suitable non-conducting material. This construction admits of hoisting the heater or tubular structure M M' out of the top of the cylinder, by simply removing the nuts $l$ $l$ and uncoupling the pipes below. Such construction is clearly exhibited in fig. 5 of the drawing.

The piston F is kept tight by a liquid packing, operating upon cup-leathers e e. This is done by a portion of the liquid introduced by the sprinkler J, to reduce the temperature of the air in the working cylinder, entering from above the piston, through a valve, f, into the interior of the piston, and, by a flexible diaphragm, g, or piston arrangement acted upon by the pressure of the air from beneath, and serving to compress the liquid in the piston. In this way the pressure alternately applied above and below the piston F, serves to keep it tight.

The stuffing-boxes $h^x$, of the piston-rods, may be similarly kept tight by the liquid admitted through branch-pipes c c to act upon the interior of double-cup leather packings i<sup>×</sup> i<sup>×</sup> thereto, said leather packings being confined by means of the glands and suitable rings. The same arrangements of liquid pressure, acting on the cupped leather packings, held by glands and rings, are applied to the stuffing-boxes of the valve-stems. Such mode of packing the several working parts liable to leakage is of considerable importance in a high-pressure hot-air engine.

What is here claimed, and desired to be secured by Letters Patent, is—

1. The tank of isolated hot liquid in the lower part of the cylinder of a high-pressure hot-air engine, substantially as described.

2. The tubular arrangement or heater for imparting to the liquid in the cylinder heat derived from another liquid, gas, or vapor, circulated in the heater, constructed substantially as described.

3. The arrangement of a sprinkler above the piston, in combination with a heater below the piston, for heating and cooling the air, substantially as described.

4. The combination, with the liquid-heating chamber, below the piston, and sprinkling cooling-chamber above, of the regenerator G, all arranged for operation substantially as described.

5. The vertical slot in the shield T on the piston F, for allowing the passage of the air into the cylinder above the surface of the heating liquid, as described.

6. The prolongations R R of the piston, in combination with the hot liquid, in which they dip, for the purpose set forth.

7. The arrangement of the sprinkling-cups S S S between the vertical laminæ or prolongation of the piston, for the purposes described.

8. The combination, with the hollow working piston of a hot-air engine, of the valve f, the flexible diaphragm g, and the cup-leathers e e, in connection with a cooling liquid above the piston, to establish a liquid packing capable of being tightened by alternating pressure above and below.

9. The receiver, composed of the inner and outer cylinders or vessels A U, with their connections and communications, substantially as and for the purpose set forth.

10. The construction of the joints where the pipes P and Q enter and leave the working cylinder and tank L, substantially as described.

11. The cup-leather and liquid-packings to the stuffing-boxes of the piston-rods and valve-stems of a high-pressure hot-air engine, in combination with a high-pressure reservoir, and the pipes c c', connecting them, substantially as and for the purpose described.

12. The combination of the flap-valve I with the slide-valve H, essentially as and for the purpose specified.

CHAS. P. LEAVITT.

Witnesses:
JOHN D. ROSSET,
HENRY PALMER.